United States Patent
Hyodo

(10) Patent No.: US 6,919,927 B1
(45) Date of Patent: Jul. 19, 2005

(54) CAMERA WITH TOUCHSCREEN

(75) Inventor: Manabu Hyodo, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 09/324,778

(22) Filed: Jun. 3, 1999

(30) Foreign Application Priority Data

Jun. 5, 1998 (JP) .......................... 10-157481

(51) Int. Cl.$^7$ .......................................... H04N 5/222
(52) U.S. Cl. ............................ 348/333.02; 348/333.11
(58) Field of Search .................. 348/207.99, 333.05, 348/333.02, 333.11, 341, 373, 211.8, 589, 600; 345/173, 179, 156; 386/52, 46

(56) References Cited

U.S. PATENT DOCUMENTS

| | | | | |
|---|---|---|---|---|
| 4,386,347 A | * | 5/1983 | Cutler et al. ................. | 345/173 |
| 4,933,660 A | * | 6/1990 | Wynne, Jr. .................... | 338/114 |
| 5,289,168 A | * | 2/1994 | Freeman ....................... | 345/672 |
| 5,396,287 A | * | 3/1995 | Cho ........................... | 348/211.8 |
| 5,467,102 A | * | 11/1995 | Kuno et al. .................... | 345/1.3 |
| 5,671,014 A | * | 9/1997 | Ito et al. ...................... | 348/589 |
| 5,689,742 A | * | 11/1997 | Chamberlain, IV .... | 348/333.02 |
| 5,862,419 A | * | 1/1999 | Goto et al. ................... | 396/121 |
| 5,867,158 A | * | 2/1999 | Murasaki et al. ............. | 345/785 |
| 5,923,908 A | * | 7/1999 | Schrock et al. ............... | 396/85 |
| 6,104,334 A | * | 8/2000 | Allport ........................ | 345/169 |
| 6,239,790 B1 | * | 5/2001 | Martinelli et al. ........... | 345/174 |
| 6,414,671 B1 | * | 7/2002 | Gillespie et al. ............ | 345/157 |
| 2002/0057353 A1 | * | 5/2002 | Kitsugi et al. .............. | 348/232 |
| 2002/0075244 A1 | * | 6/2002 | Tani et al. ................... | 345/173 |
| 2002/0105582 A1 | * | 8/2002 | IKeda ......................... | 348/187 |
| 2002/0110354 A1 | * | 8/2002 | Ikeda et al. ................... | 386/52 |

FOREIGN PATENT DOCUMENTS

| | | | |
|---|---|---|---|
| JP | 08006698 | | 1/1996 |
| JP | 08221202 | | 8/1996 |
| JP | 08-221202 | * | 8/1996 |
| JP | 09114593 | | 5/1997 |
| JP | 09116792 | | 5/1997 |

* cited by examiner

Primary Examiner—Aung Moe
(74) Attorney, Agent, or Firm—Birch, Stewart, Kolasch & Birch, LLP

(57) ABSTRACT

A camera which can perform operations by touching a screen of an image display and can give different instructions according to different pressures applied on the touching. A digital camera has an LCD for displaying the captured image or a reproduced image. A touch panel for determining the position of a touched portion and the pressure applied to the touched portion is provided over the LCD. The camera gives a variety of instructions with respect to a camera operating system according to pressure applied to the touched portion on the touch panel. For example, the touch panel instructs an image-recording preparation in a case that the pressure is no more than a predetermined pressure, and instructs image-recording in a case that the pressure is more than the predetermined pressure. In short, adjusting a focus and an exposure to the principal subject by touching the principal subject displayed on the LCD, and touching the principal subject harder can record an image of the principal subject.

5 Claims, 7 Drawing Sheets

F I G. 1
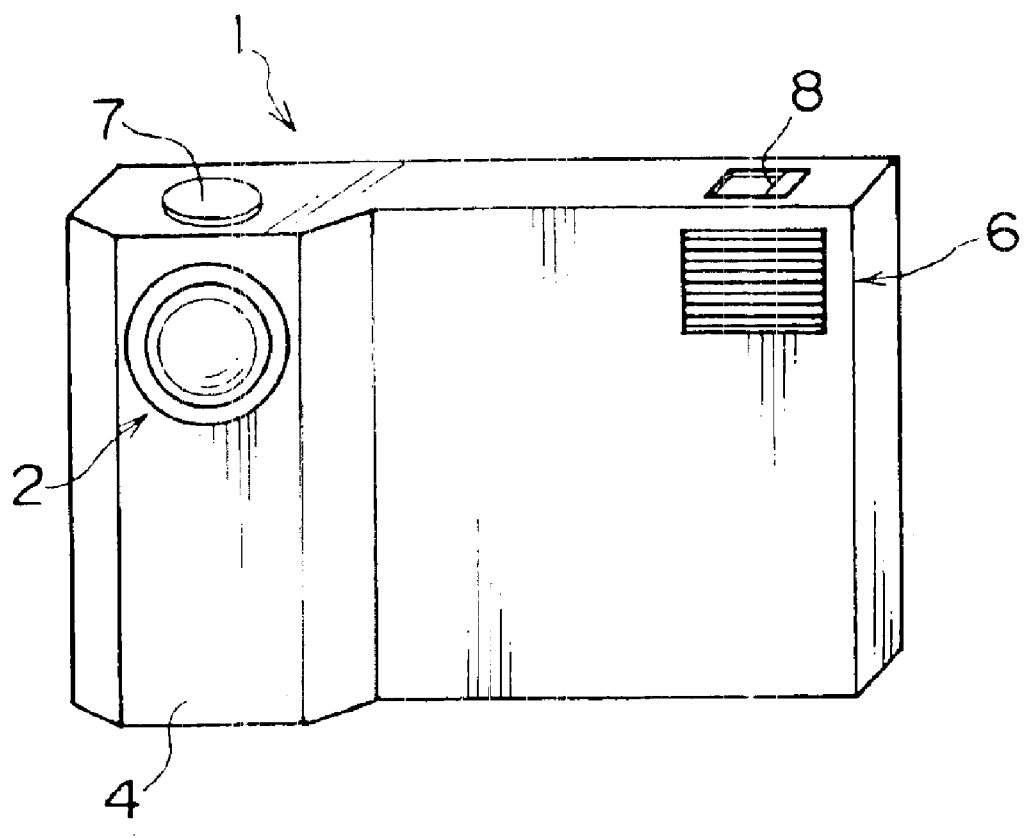

F I G. 4
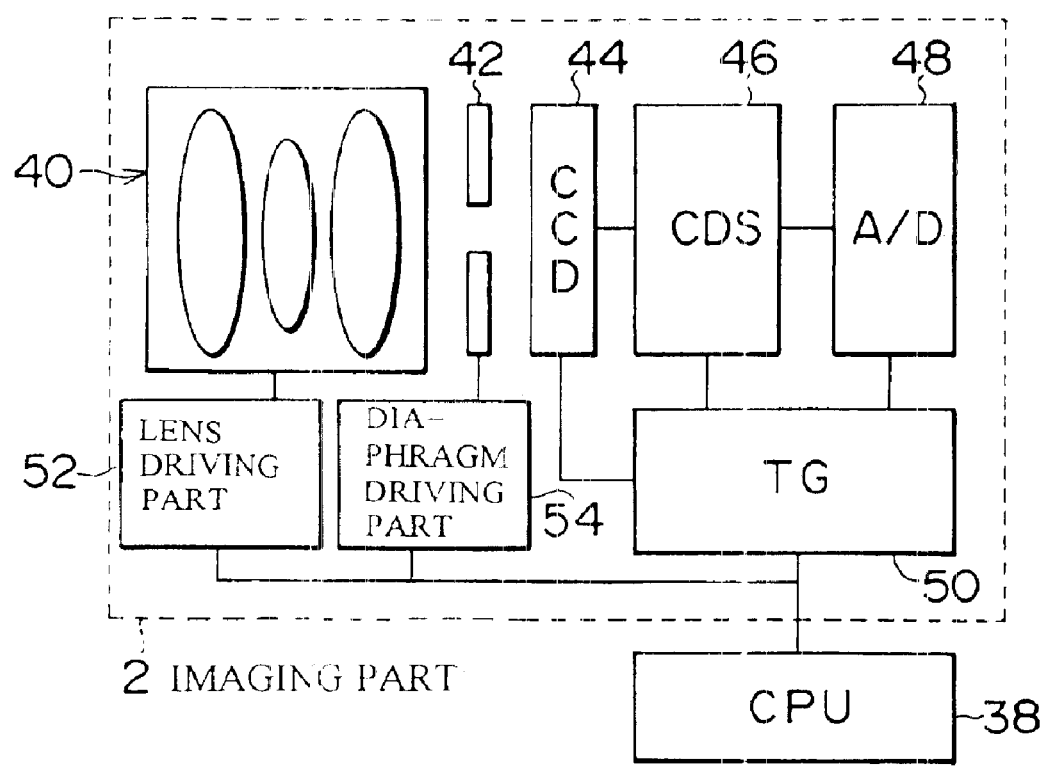

F I G. 7
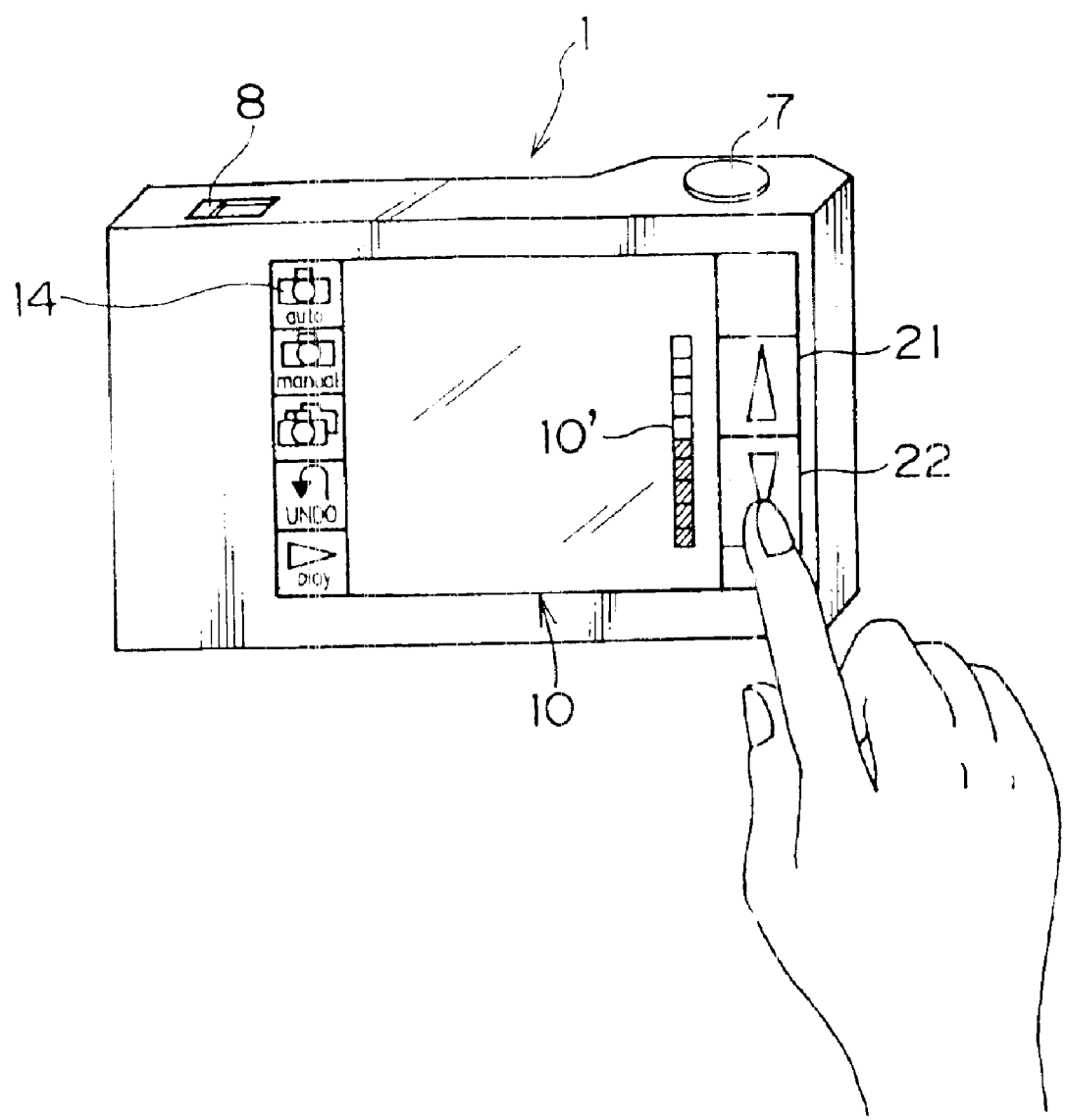

CAMERA WITH TOUCHSCREEN

CROSS REFERENCE TO RELATED APPLICATIONS

This application is related to pending U.S. application Ser. No. 09/182,875 entitled CAMERA PROVIDED WITH TOUCHSCREEN assigned to the assignee of the present application. The entire disclosure of that application is hereby incorporated by reference.

BACKGROUND OF THE INVENTION

1. Field of the Invention

The present invention generally relates to a camera with an image display, and more particularly to a camera with an image display having a touch panel.

2. Description of Related Art

An information processing device in an information processing system is disclosed in Japanese Patent Provisional Publication No. 9-114593. The information processing device increases and decreases a size of an area of a screen, on which images are displayed, in proportion to a pressure applied on a touch panel provided over the screen. When a desired image is selected while a plurality of images are sequentially displayed, the images are displayed in the area whose size is proportion to the pressure applied on the touch panel and is updated to the next image. This method enables the device to update the images for a short period as compared with a case to display the next image after one entire image is completely displayed. When the desired image is displayed, releasing the touch panel displays the entire desired image.

An information display in which a user presses a touch switch lightly for selecting an item, and then presses the touch switch hard for confirming the item, is disclosed in Japanese Patent Provisional Publication No. 8-221202.

Japanese Patent Provisional Publication No. 8-6698 discloses a character style making method in which a user writes a character on a touch panel with a pen or a finger while changing pressure force to change a boldness of the writing line in proportion to the pressure force to thereby easily make a character style like a brush writing.

Japanese Patent Provisional Publication No. 9-116792 discloses a method for operating a video camera in which an image captured by the video camera is displayed on a display unit, operational items of the video camera are superimposed on the image, and a touch panel is provided over the display unit so that a user can select the operational item by touching the touch panel with a finger.

However, conventionally there has not been a camera with a touch panel, capable of measuring an applied pressure, provided over an image display for displaying a captured image and a reproduced image by the camera. In addition, there has not been a camera, which appropriately instructs a camera operation system in accordance with a pressure force applied to the touch panel.

SUMMARY OF THE INVENTION

The present invention has been developed in view of the above-described circumstances, and has as its object the provision of a camera which is capable of being operated by touching a screen of an image display and is capable of giving a variety of instructions in accordance with pressures applied upon the touching.

In order to achieve the above-described object, the camera of the present invention comprises: an image display for displaying at least one of a captured image and a reproduced image; a touch panel for determining a pressure applied on a surface thereof, the touch panel being arranged over the image display; and a controller for controlling operations of the camera according to the pressure determined by the touch panel.

The camera is preferably characterized in that: the controller performs an image-recording preparation in a case that the pressure determined by the touch panel is no more than a predetermined value, and performs an image-recording in a case that the pressure determined by the touch panel is more than the predetermined value.

The camera is preferably characterized in that: the touch panel determines a position of a touched portion on the surface thereof; and the controller adjusts at least one of a focus and an exposure of the camera with respect to a principal subject corresponding to the position of the touched portion determined by the touch panel.

According to the camera of the present invention, the focussing and exposure is adjusted to the principal subject by touching the principal subject that is displayed on the image display, and the image of the principal subject can be recorded by pressing the principal subject harder.

Moreover, the camera is preferably characterized in that: the image display displays a plurality of operational items; the touch panel determines a position of a touched portion on the surface thereof; and the controller performs an operational item which corresponds to the position of the touched portion determined by the touch panel, the operational item being among the plurality of operational items which are displayed on the image display.

Further, the camera is preferably characterized in that: the plurality of operational items includes at least one of zooming, frame forwarding of the reproduced image, screen scrolling, luminance adjustment of the image display and volume adjustment at audio reproduction; and the controller changes at least one of zooming rate, frame forwarding speed, screen scrolling speed, luminance of the image display and volume at the audio reproduction, according to the pressure determined by the touch panel when performing at least one of the zooming, the frame forwarding of the reproduced image, the screen scrolling, the luminance adjustment of the image display and the volume adjustment at the audio reproduction.

Furthermore, the camera is preferably characterized in that: the image display displays the pressure determined by the touch panel.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a front view showing a camera according to an embodiment of the present invention;

FIG. 4 is a block diagram showing essential parts of the structure of an imaging part in FIG. 3;

FIG. 7 is a rear view of the camera showing an embodiment to operate camera operational items with use of the touch panel.

DETAILED DESCRIPTION OF THE PREFERRED EMBODIMENT

Hereunder, a preferred embodiment of the present invention is explained in detail according to the accompanying drawings.

Figure 2:
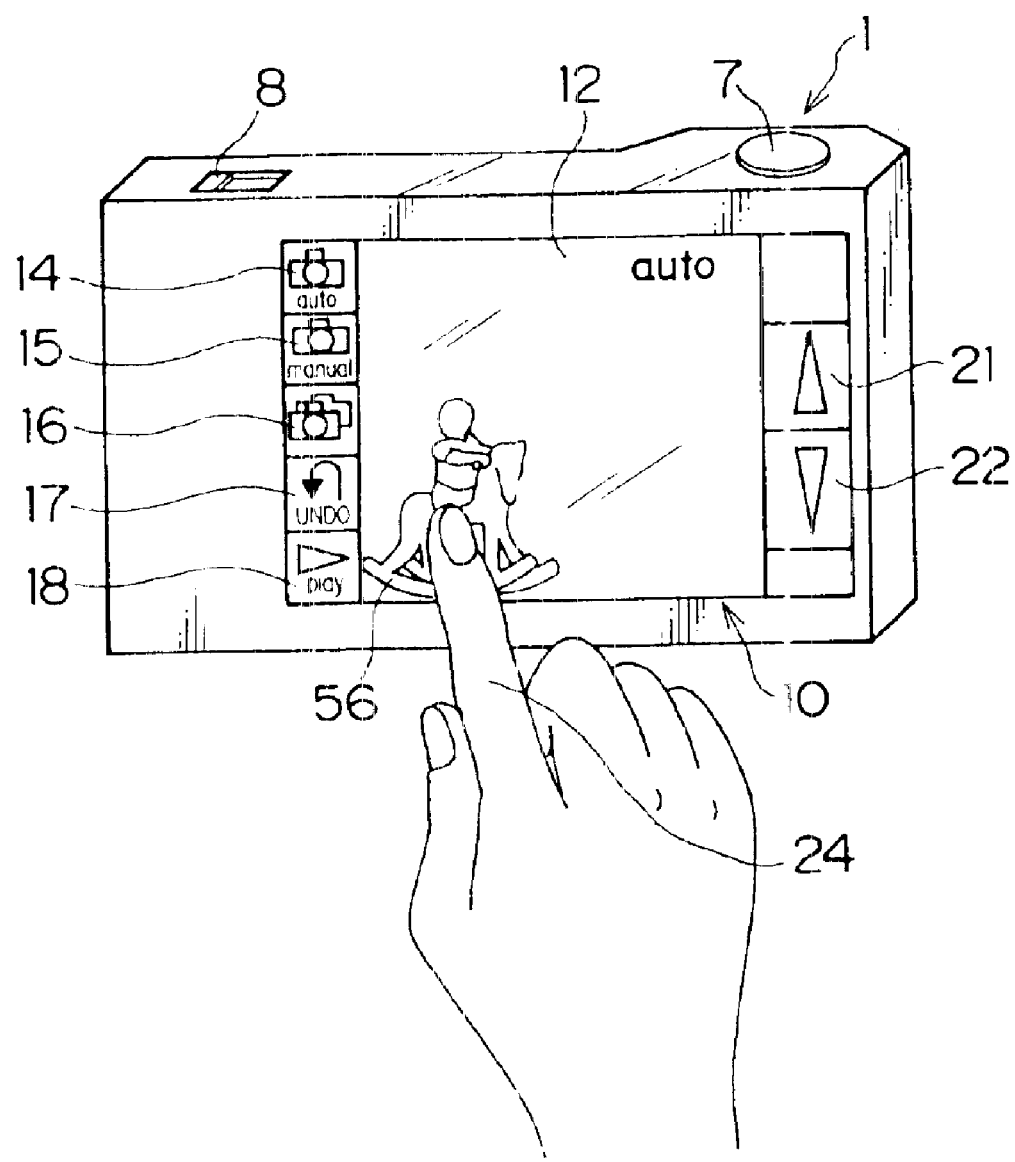
FIG. 2 is a rear view showing the camera in FIG. 1.

FIGS. 1 and 2 are a front view and rear view, respectively, showing a camera according to an embodiment of the present invention, specifically showing a digital camera 1 with a liquid crystal display (LCD) 10 as an image display.

As shown in FIG. 1, an imaging part 2 is provided at the front upper left corner of the digital camera 1, and a grip 4, which a user can easily hold the camera 1 with his/her right hand, is formed at the front left part of the camera 1 including the imaging part 2. The specific structure of the imaging part 2 will be described later, but basically, the imaging part 2 has an imaging optical system or a taking lens and an imaging device or a charge-coupled device (CCD) arranged behind the taking lens. An auxiliary flashing part 6 is arranged at the front upper right corner of the camera 1, and a shutter release button 7 and a power switch 8 are arranged at the top of the camera 1. When the shutter release button 7 is half-pressed, a switch SW1 (not shown) is turned on, and the camera 1 performs an image-recording preparation. Then, the shutter release button 7 is fully-pressed, a switch SW2 (not shown) is turned on, and the camera 1 performs an image-recording.

The camera 1 is provided with the LCD 10 at its rear face as shown in FIG. 2. A touch panel 12 with light permeability is arranged over the LCD 10. The touch panel 12 can measure touch three-dimensionally; the touch panel 12 can output a signal indicating a position (XY coordinate values) of a touched portion on a panel surface and a signal indicating a pressure (Z coordinate value) applied to the touched portion. As described later, the touch panel 12 can give a variety of instructions according to the position of the touched portion and the pressure applied to the touched portion.

Operation buttons are displayed at the right and left edges of the LCD 10. For example, beginning from top, an auto mode button 14, a manual mode button 15, a plural designation modes button 16, a cancellation (UNDO) button 17, and a reproducing (PLAY) button 18, are sequentially displayed at the left edge, and an up button 21 and a down button 22 are displayed at the right edge.

When the user presses these operation buttons or a principal subject 56 in the displayed image on the LCD 10 with a finger (including thumb) 24 or a pen, the operated button or a position of the principal subject can be determined from the position of the touched portion (XY coordinate values), which is determined by the touch panel 12; and moreover, different instructions can be given according to the pressure force (Z coordinate value) determined by the touch panel 12 as described later.

Figure 3:
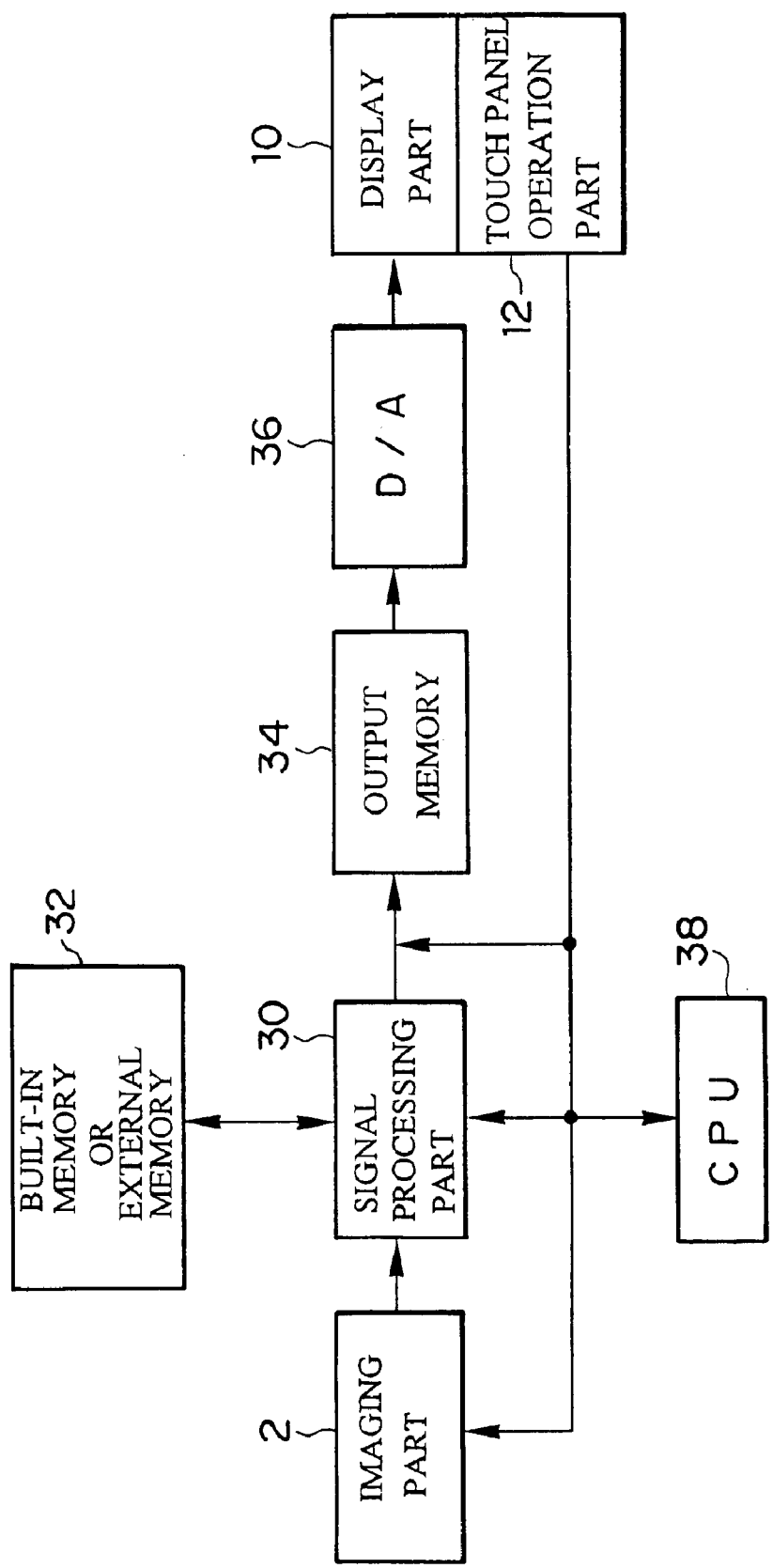
FIG. 3 is a block diagram showing the inner structure of the camera in FIG. 1.

FIG. 3 is a block diagram showing the inner structure of the digital camera 1, and FIG. 4 is a block diagram showing structure of the imaging part 2 in FIG. 3. The digital camera 1 comprises the imaging part 2, a signal processing part 30, a built-in memory (or an external memory) 32, an output memory 34, a D/A converter 36, the LCD 10, the touch panel 12 and a central processing unit (CPU) 38.

As shown in FIG. 4, the imaging part 2 comprises the taking lens 40, a diaphragm 42, the CCD 44, a CDS circuit 46, an A/D converter 48, a timing generator 50, a lens driving part 52, and a diaphragm driving part 54.

The taking lens 40 is a zoom lens composed of multiple lenses. The taking lens 40 can be zoomed in a telephoto or a widephoto direction by a driving force from the lens driving part 52 including a motor (not shown). In addition, a focus lens can be moved by an autofocus (AF) function, which will be described later.

The diaphragm 42 has a diaphragm plate, in which diaphragm holes are formed. The diaphragm plate is rotated by a driving force of the diaphragm driving part 54 in order to change the diaphragm between a full-open diaphragm (F2.4) and a reduced diaphragm (F6.7). The structure of the diaphragm is not limited to that; an iris diaphragm may be used to change the diaphragm at a number of phases, for example.

The subject image formed on a light-receiving surface of the CCD 44 through the taking lens 40 is photoelectrically converted, and sequentially read out as an image signal. Each pixel of the image signal, read out from the CCD 44, is performed a sampling holding at the CDS circuit 46 and amplified by a gain control amplifier (not shown). Then, the image signal is converted to R, G, and B dot-sequential digital signals by the A/ID converter 48 and outputted to the signal processing part 30.

A timing signal is applied to the CCD 44, the CDS circuit 46, and the A/D converter 48 of the imaging part 2 from the timing generator 50, which is controlled by the CPU 38 to thereby synchronize the circuits.

The structure of the signal processing part 30 is not shown in detail, but it includes digital image processing circuits such as a luminance signal generating circuit, a color difference signal generating circuit, a photometric value calculation circuit, and a compression/expansion circuit. The image signal, read out from the imaging part 2, is appropriately processed at the signal processing part 30, and recorded in a recording part such as the built-in memory 32 (e.g. a flash memory built in the camera) or a detachable external memory card in response to an input of a release trigger signal. Although the details will be described later, the digital camera 1 generates the release trigger signal when the shutter release button 7 or the touch panel 12 is pressed.

The image signal that is read out from the imaging part 2, and the image signal that is read out from the built-in memory (or the detachable external memory) 32, are processed at the signal processing part 30, and outputted to the output memory 34. Then, the image signal is transmitted to the LCD 10 through the D/A converter 36, and the captured image or a reproduced image is displayed on the LCD 10. The LCD 10 is capable of displaying not only still images, which are stored by the shutter releasing, but also images (moving images or intermittent images) before the shutter releasing.

The CPU 38 supervises the circuits in the camera 1, and determines the touched portion of the touch panel 12 and the pressure applied to the touched portion according to the signals outputted from the touch panel 12. The CPU 38 also controls the imaging part 2 for zooming, focusing, etc., the display on the LCD 10, and the writing/reading of the image data into/from the image memory 32. The CPU 38 performs calculations for an exposure value, a focal position, and so forth, according to a predetermined algorithm, controls automatic exposure, auto focus, auto flashing, auto white balance, and so forth, and also controls each circuit of the camera 1 according to an input from an operation part such as the touch panel 12 and the release button 7. More specifically, the CPU 38 controls the diaphragm 42 and an electronic shutter value of the CCD 44 of the imaging part 2 according to the exposure value calculated from the image signal so as to set the exposure value, and also controls the gain control amplifier according to a calculated RB gain value so as to set the white balance.

When the user touches the display screen (the touch panel 12) of the LCD 10, the position of the touched portion is determined, and one of predetermined photometric areas, to which the touched portion belongs, is designated. Then, a photometric value for the designated photometric area is determined, and the exposure value is determined according to the photometric value.

Alternately, the exposure value may be determined as follows. The area of the principal subject is determined according to the determination of the position of the touched portion. The exposure value is determined by calculating the photometric value for the entire screen by weighting to the measured photometry value for the area including the principal subject while lightening the measured photometry values for the other areas.

The CPU 38 calculates a focus evaluation value, which indicates a sharpness of the subject image, from the image signal and controls the focus system of the taking lens 40 via the lens driving part 52 based on the focus evaluation value to set the focal position. When the user touches the touch panel 12 on the LCD 10, the position of the touched portion on the touch panel 12 is determined, and one of predetermined focal areas, to which the touched portion belongs, is designated. Then, a focus evaluation value is calculated from the image signal of the designated focal area in order to control the focus system of the taking lens 40 based on the focus evaluation value.

The auto focus operation is not limited to this; it may use a known focal means such as an AF sensor.

The CPU 38 also controls a zoom optical system via the lens driving part 52 according to a designated focal length of the taking lens 40, which is set by the user with the zoom operation means, to thereby set the focal length of the taking lens 40.

The case will be explained next in which signals that indicate a half-pressing (the switch SW1 ON) and a full-pressing (the switch SW2 ON) of the release button 7 are generated corresponding to the pressure applied on the touch panel 12 in the digital camera 1, which is constructed as described above.

Figure 5:
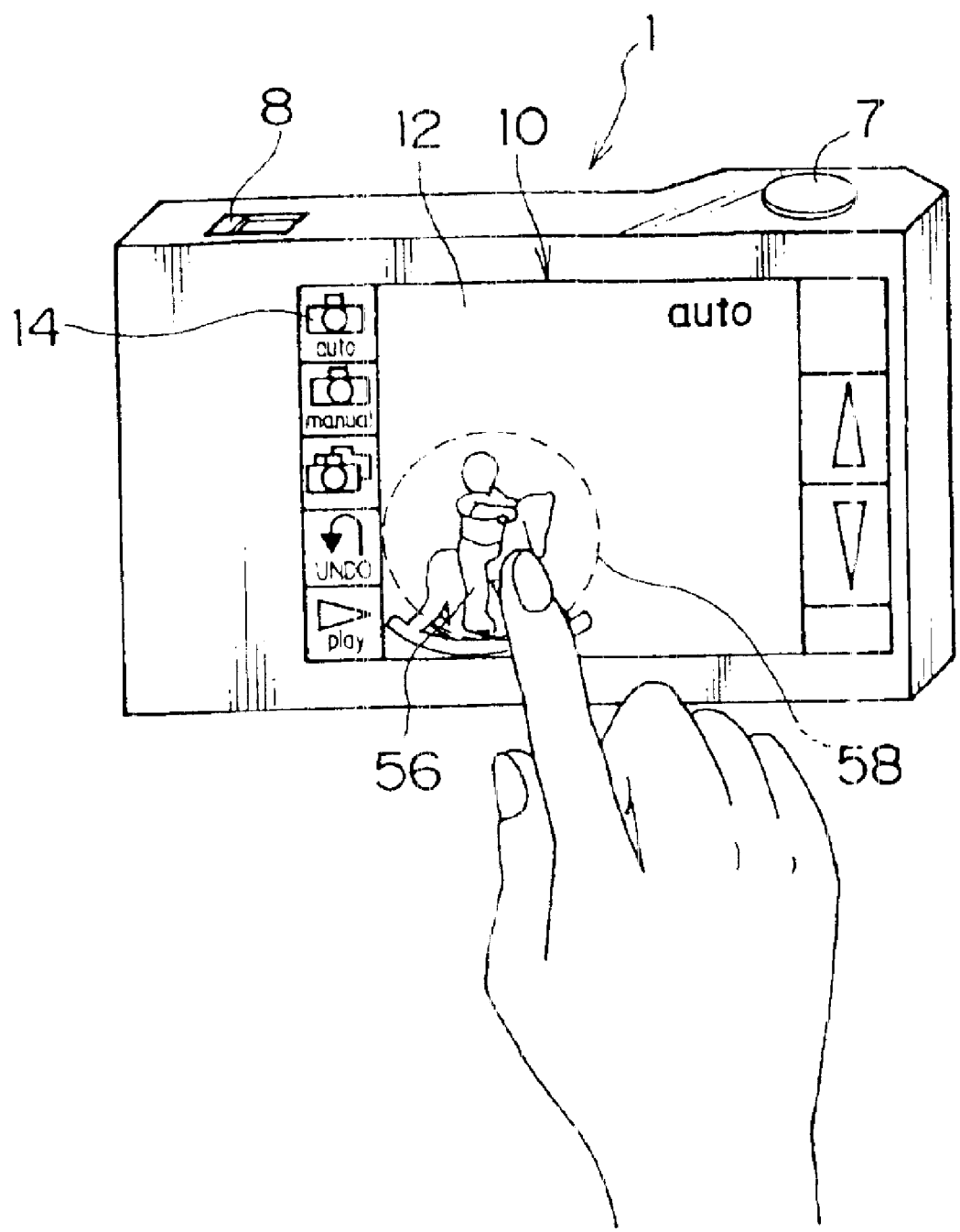
FIG. 5 is a rear view of the camera for showing an image-recording with use of a touch panel.

The digital camera 1 is set to be an auto mode when a power switch 8 is turned on or the auto mode button 14 is pressed, and at that time the LCD 10 displays "auto" at the upper right of the screen (refer to FIG. 5). Pressing the manual mode button 15 sets the camera 1 to be a manual mode in which luminance and focus adjustment can be manually performed. Hereunder, a case for image-recording in the auto mode will be explained.

Figure 6:
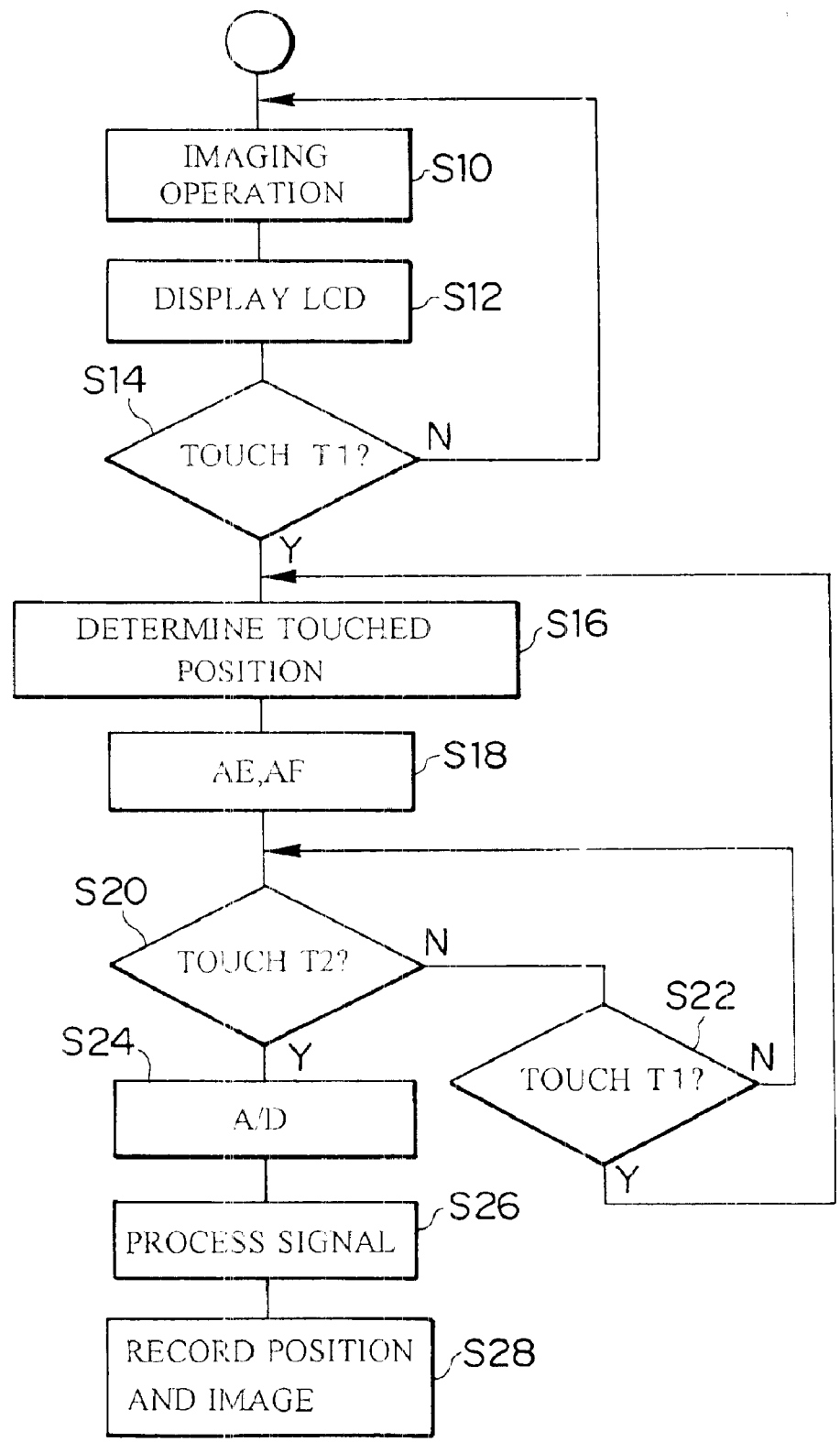
FIG. 6 is a flow chart showing a procedure of image-recording.

As shown in FIG. 6, when the power switch 8 is turned on and the digital camera 1 is set to be the auto mode, the imaging part 2 is operated, and the image signal representing the subject image is obtained via the imaging part 2 (S10). The LCD 10 displays the captured image (moving image) based on the obtained image signal (S12).

After that, whether the touch panel 12 on the LCD 10 is touched with a pressure no more than the predetermined pressure (this touch is referred as a touch T1) is determined (S14). As shown in FIG. 5, when the principal subject 56 (touch panel 12), displayed on the screen of the LCD 10, is touched with the pressure force less than the predetermined pressure force (the touch T1), the process goes on to S16 and an image-recording preparation is performed.

In short, the position of the touched portion on the touch panel 12 is determined at S16, and the position of the touched portion is recognized as the position of the principal subject 56. Then, as shown in FIG. 5, an area inside a circle in the predetermined size, which has the position of the touched portion as its center, is recognized to be the principal subject 56, and the area of the principal subject, determined as described above, is circled with a frame (hereunder called an instruction frame) 58 and displayed. The user can recognize by the display of the instruction frame 58 that the image-recording preparation has been performed. Additionally, as to a method for recognizing the principal subject may be a method in which a portion with substantially the same luminance around the position of the touched portion is recognized to be the principal subject based on the luminance of the position of the touched portion.

Auto-exposure (AE) and auto-focussing (AF) are performed (S18) based on the area of the instruction frame 58 which includes the principal subject 56 that is determined as described above.

After that, whether the pressure force applied on the touch panel 12 is more than the predetermined pressure (this touch is referred as a touch T2) is determined (S20). If the pressure applied on the touch panel 12 does not reach the touch T2, whether the touch T1 is performed on the touch panel 12 is determined further (S22). If the touch T1 is not detected at S22 (i.e. the finger has been away from the touch panel 12), the process returns to S20. The focussing and the auto-exposure are locked by this process. On the other hand, if the touch T1 is detected at S22, the process returns to S16. The position of the touched portion is re-determined at S16, the instruction frame 58 is altered to the newly-instructed position, and the new instruction frame 58 is formed. Moreover, AE and AF are performed according to the new instruction frame 58.

When the user presses the touch panel 12 with a pressure that is stronger than the predetermined pressure and the touch T2 is detected at S20, an image-recording is performed. In other words, the image signal for image-recording is read out from the imaging part 2 and digitized by an A/D converter, and predetermined signal processing (such as YC conversion and JPEG compression) is performed (S24 and S26). The image data, performed the above-described signal processing, is recorded in the built-in memory (or the external memory) 32 with positional information of the touched portion on the touch panel 12 (S28), and the image-recording is completed. The positional information, recorded at that time, may be a number of pixels (coordinates) from the upper left corner (origin) of the screen of the LCD 10, or a distance calculated from the number of pixels. The origin may be another corner of the screen or the center of the screen. Moreover, the positional information may be determined according to a spatial distance on the touch panel 12 instead of the number of pixels. As described above the image to be recorded is confirmed.

At performing image-recording action by the touch T2 on the touch panel 12, it is preferable to indicate to the user that the shutter is released by generating a shutter sound, etc.

In the above-described embodiment, the image-recording preparation (with T1) and image-recording (with T2) are designated by the different pressures applied on the touch panel 12; however the present invention is not limited to that. Speeds for performing a variety of types of camera operating items may be changed according to the pressure applied on the up button 21 and the down button 22 of the touch panel 12.

In other words, a zoom rate may be changed by the pressure applied on the up button 21 and the down button 22 at the zooming, or a frame forwarding speed of the reproduced image may be changed by the pressure applied on the up button 21 and the down button 22, or a frame forwarding speed at selecting a template image may be changed by the pressure applied on the up button 21 and the down button 22 at a composing mode in which the captured image and the template image are combined. Moreover, when displaying an image by scrolling the image which size is larger than the displayable size of the LCD 10 (e.g. a panoramic image), a scrolling speed may be changed by the pressure applied on the up button 21 and the down button 22, or further, an adjusting speed for adjusting luminance of the LCD 10 and for adjusting a volume at audio reproduction, may be changed according to the pressure applied on the up button 21 and the down button 22.

In addition, when changing a speed of an each type of a camera operational item by the pressure applied on the touch panel 12, the determined pressure is preferably indicated with a level display part 10' displayed on the LCD 10 as shown in FIG. 7; thereby the pressure applied on the touch panel 12 can be adjusted while looking at the level display part 10'.

Moreover, if the finger leaves the touch panel 12, or the pressure is decreased, the signal for indicating the pressure is changed correspondingly, and the speed at the camera operating items becomes 0, or slower. But the present invention is not limited to that. The speed at the camera operating items may be changed corresponding to the accumulation of the pressure, so as to maintain the speed even if the finger leaves the touch panel 12 and increases the speed if pressing the touch panel 12 further.

In this embodiment, a digital camera, which uses the memory for electronically recording information such as the image data for a media for recording the captured image, is explained as an example. However, the present invention may be applied to a video camera, which records captured images in a video tape, and a camera which uses a silver-halide film as a recording medium for recording a captured image.

As explained above, according to the camera with the touchscreen of the present invention, the camera can be operated by touching the screen of the image display, and the camera can also give different instructions according to the pressure applied upon the touching. In particular, the camera can indicate the principal subject according to the position of the touched portion on the touch panel, and can perform the image-recording preparation and the recording by determining the pressure applied on the touch panel; thus the camera can appropriately record an image of the principal subject by the sequential touching operations. Moreover, the camera can perform AF lock and AE lock by only touching the principal subject; thus the camera operation at AF lock and AE lock can be easy. Further, the camera can be operated types of operations on the touch panel; thus operating members of the camera can be eliminated, so that the screen of the image display can be larger. The shutter release button can be omitted.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:

an image display for displaying an image;

a touch panel for determining a pressure applied on a surface thereof, the touch panel being arranged over the image display; and a controller for controlling operations of the camera according to the pressure determined by the touch panel, said controller performing a first control when the pressure applied on said touch panel is greater than a first predetermined value, and performing a second control when the pressure is greater than a second predetermined value larger than the first predetermined value, wherein the first control is an image-recording preparation, and the second control is an image-recording.

2. The camera as set forth in claim 1, wherein the touch panel determines a position of a touched portion on the surface thereof, and the controller adjusts at least one of a focus and an exposure of the camera with respect to a principal subject corresponding to the position of the touched portion determined by the touch panel.

3. The camera as set forth in claim 1, wherein the image displays a plurality of operational items, the touch panel determines a position of a touched portion on the surface thereof, and the controller performs an operation of one of the plurality of operational items corresponding to the touched portion determined by the touch panel.

4. A camera, comprising:

a touch panel for determining a pressure applied on a surface thereof; and a controller for controlling operations of the camera according to the pressure determined by the touch panel, said controller performing a first control when the pressure applied on said touch panel is greater than a first predetermined value, and performing a second control when the pressure is greater than a second predetermined value larger than the first predetermined value, wherein the first control is an image-recording preparation, and the second control is an image-recording.

5. A camera, comprising:

a touch panel that determines a pressure being applied on a surface thereof and outputting a signal indicative of the pressure;

a controller for continuously varying a speed of change of a parameter in proportion to the signal; and an image display that displays a diagram indicative of the changes in the pressure.

* * * * *